(12) United States Patent
Chen et al.

(10) Patent No.: US 9,146,839 B2
(45) Date of Patent: Sep. 29, 2015

(54) METHOD FOR PRE-TESTING SOFTWARE COMPATIBILITY AND SYSTEM THEREOF

(71) Applicant: INSTITUTE FOR INFORMATION INDUSTRY, Taipei (TW)

(72) Inventors: Shih-Jen Chen, New Taipei (TW); Chien-Ting Kuo, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 43 days.

(21) Appl. No.: 14/078,876

(22) Filed: Nov. 13, 2013

(65) Prior Publication Data

US 2015/0089479 A1 Mar. 26, 2015

(30) Foreign Application Priority Data

Sep. 23, 2013 (TW) .............................. 102134070 A

(51) Int. Cl.
*G06F 11/36* (2006.01)
(52) U.S. Cl.
CPC ........ *G06F 11/3664* (2013.01); *G06F 11/3688* (2013.01); *G06F 11/3684* (2013.01)
(58) Field of Classification Search
None
See application file for complete search history.

(56) References Cited

U.S. PATENT DOCUMENTS

| | | | |
|---|---|---|---|
| 8,423,993 B2 | 4/2013 | Faus et al. | |
| 2008/0126792 A1* | 5/2008 | Herington et al. | 713/100 |
| 2008/0209409 A1* | 8/2008 | Van Riel et al. | 717/168 |
| 2008/0301676 A1* | 12/2008 | Alpern et al. | 718/1 |
| 2009/0113413 A1* | 4/2009 | Reinz | 717/173 |

FOREIGN PATENT DOCUMENTS

| | | |
|---|---|---|
| CN | 102831062 A | 12/2012 |
| WO | WO 2009052424 A2 | 4/2009 |

OTHER PUBLICATIONS

GB Patent Office, Office action issued on Apr. 25, 2014.
Bruce Wu, "How to use Program Compatibility Wizard on Window Vista system", Mar. 22, 2007, http://www.xspace.idv.tw/bo_blog/post/42/.
JERRY710822, "Window 8 helper tell you whether the computer can be upgraded to Windows 8", Jan. 22, 2013, http://download.ithome.com.tw/article/index/id/1712.
Taiwan Patent Office, Office action issued on Jan. 26, 2015.
Great Britain Patent Office, Office action issued on May 19, 2015.

* cited by examiner

*Primary Examiner* — Don Wong
*Assistant Examiner* — Shirin Alizadeh
(74) *Attorney, Agent, or Firm* — Li & Cai Intellectual Property (USA) Office

(57) ABSTRACT

A method for pre-testing software compatibility is illustrated. A system and software information of an operating system is extracted. While that a patch or new software will be installed in the operating system is detected, whether a compatibility test should be executed is determined. While that the compatibility test should be executed is detected, a virtual machine with a first clone system is generated, wherein the first clone system is generated according to the system and software information. The patch or the new software is installed in the first clone system to generate a second clone system. The compatibility test for the second clone system is executed. According to a result of the compatibility test, whether the patch or new software can be installed in the operating system or the second clone system can be switched to be used is determined.

15 Claims, 10 Drawing Sheets

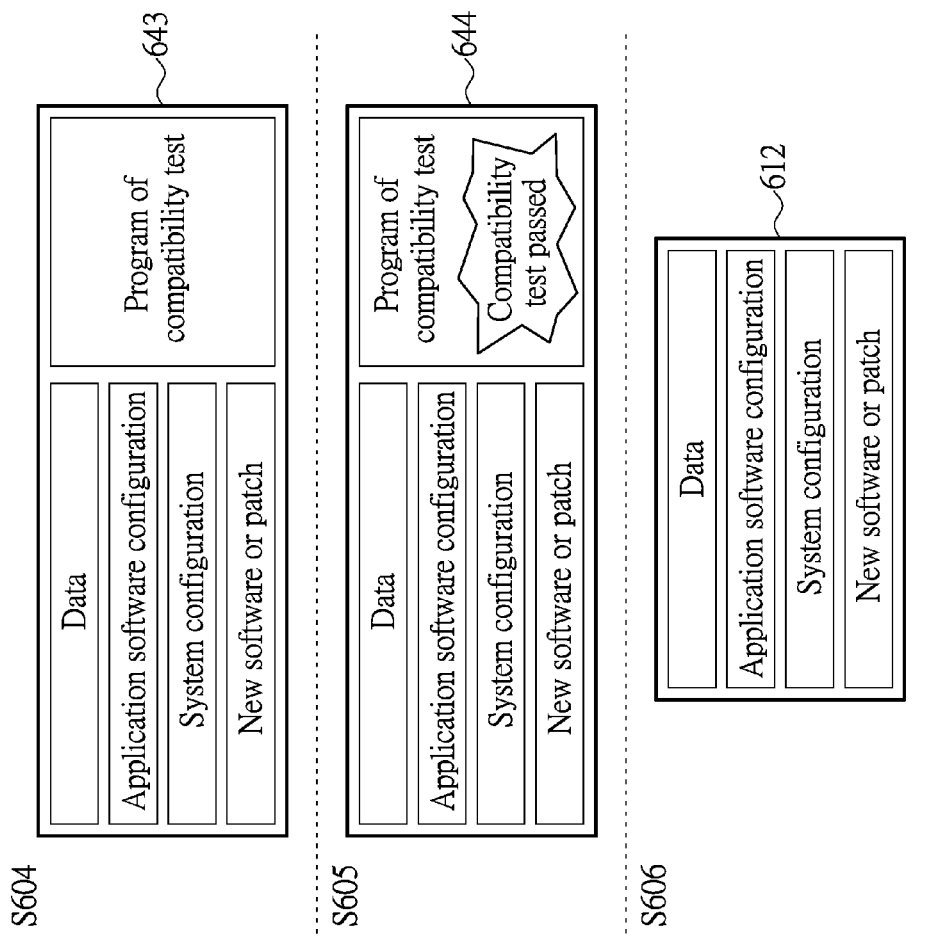

METHOD FOR PRE-TESTING SOFTWARE COMPATIBILITY AND SYSTEM THEREOF

BACKGROUND

1. Technical Field

The present disclosure relates to a method for testing software compatibility, in particular, to a method for pre-testing software compatibility and a system thereof.

2. Description of Related Art

With the technology advancement, information industrial develops rapidly and widely. People in daily life usually use the computing device or the cloud server, and the computing device or the cloud server has an operating system, such that the user can operate the computing device or the cloud server through the operating system. However, when the user installs the new software in the operating system, the software patch (for updating the software), or the operating system patch in (for updating the operating system) in the operating system, the incompatible problem may sometimes occur, and thus an error may be generated in portion of softwares and the operating system itself.

To avoid the error generation due to the incompatible problem of the portion of softwares and the operating system itself, a currently used manner is to backup the operating system and the installed softwares in each step which the new software or the patch is installed in the operating system, such that when the error is generated in the portion of the softwares or the operating system itself, the backup data can be used to recover the operating system.

A system snapshot is a technology which can backup a system image of the whole operating system (comprising the softwares installed therein) and recover the operating system. However, when the backup number and the backup organization number increases, the system snapshot consumes a great quantity of the storage space.

Additionally, another currently used manner is that the user reports the information related to the software installation proceeding, software update proceeding, or operating system update proceeding to the software company, and then the software company deals with the problems accordingly. However, the manner passively waits the problem to occur, and then integrates the related data, but does not actively find the incompatible problem.

Regarding the information security check, the operating system or the software must be updated to maintain the information security and avoid the hidden risk of the information security. However, if the system snapshot is used to backup the system image periodically, or during the software installation, the software update, or the operating system update, the consumption of the storage space is increasing as time advances. If the compatibility is not tested, and the error is generated in the portion of the softwares or the operating system, it may be convenient for the user to use the software or the operating system, and even cause the work stop.

In addition, if the computing devices or cloud servers must process the software installation, software update, or the operating system update, the management information system (MIS) engineer can understand whether the incompatible problem exists merely after each of the computing devices or cloud servers have finished the software installation, software update, or the operating system update. If the incompatible problem exists, the MIS engineer must recover the operating system by using the system image backup by the system snapshot, or report the related information to the corresponding software company to request the software company to deal with the problem. Thus, when the computing devices or cloud server must process the software installation, software update, or operating system update, the task of the software installation, software update, or operating system update is a heavy burden for the MIS engineer.

SUMMARY

An exemplary embodiment of the present disclosure provides a method for pre-testing software compatibility, and steps of the method for pre-testing software compatibility are illustrated as follows. A system and software information of an operating system is extracted. While that a patch or new software will be installed in the operating system is detected, whether a compatibility test should be executed is determined. While that the compatibility test should be executed is detected, a virtual machine with a first clone system is generated, wherein the first clone system is generated according to the system and software information. The patch or the new software is installed in the first clone system to generate a second clone system. The compatibility test for the second clone system is executed. According to a result of the compatibility test, whether the patch or new software can be installed in the operating system or the second clone system can be switched to be used is determined.

An exemplary embodiment of the present disclosure provides a software compatibility pre-testing system comprising a computing device. The computing device extracts a system and software information of an operating system. When the computing device detects that a patch or a new software will be installed in the operating system, the computing device determines whether a compatibility test should be executed. When the computing device determines that the compatibility test should be executed, the computing device generates a virtual machine with a first clone system, wherein the first clone system is generated according to the system and software information. The computing device installs the patch or the new software in the first clone system to generate a second clone system. The computing device executes the compatibility test for the second clone system. According to a result of the compatibility test, the computing device determines whether the patch or the new software can be installed in the operating system.

An exemplary embodiment of the present disclosure provides software compatibility pre-testing system comprising a cloud server system. The cloud server system extracts a system and software information of an operating system operated in a first virtual machine of the cloud server system. When the cloud server system detects that a patch or a new software will be installed in the operating system, the cloud server system determines whether a compatibility test should be executed. When the cloud server system determines that the compatibility test should be executed, the cloud server system generates a second virtual machine with a first clone system, wherein the first clone system is generated according to the system and software information. The cloud server system installs the patch or the new software in the first clone system to generate the second virtual machine with a second clone system. The cloud server system executes the compatibility test for the second clone system. According to a result of the compatibility test, the cloud server system determines whether the patch or the new software can be installed in the operating system of the first virtual machine, or the second virtual machine with the second clone system can be switched to be used.

An exemplary embodiment of the present disclosure provides software compatibility pre-testing system comprising a computing device and a cloud server system, wherein the cloud server system is linked to the computing device through an internet network. The computing device extracts a system and software information of an operating system to the cloud server system. When the computing device or the cloud server system detects that a patch or a new software will be installed in the operating system, the computing device or the cloud server system determines whether a compatibility test should be executed. When the computing device or the cloud server system determines that the compatibility test should be executed, the cloud server system generates a virtual machine with a first clone system, wherein the first clone system is generated according to the system and software information. The cloud server system installs the patch or the new software in the first clone system to generate a second clone system. The cloud server system executes the compatibility test for the second clone system. According to a result of the compatibility test, the computing device determines whether the patch or the new software can be installed in the operating system.

To sum up, exemplary embodiments of the present disclosure provide a method for pre-testing software compatibility and a system thereof, wherein the compatibility of the new software or the patch for the current operating system is pre-tested before the new software or the patch is installed in the operating system, such that the nuisance for recovering the operating system and the serious loss caused by that the operating system cannot be recovered can be avoided after the incompatible problem occurs.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 6A and FIG. 6B are schematic diagrams of a method for pre-testing software compatibility according to another exemplary embodiment of the present disclosure.

DESCRIPTION OF THE EXEMPLARY EMBODIMENTS

Figure 1:
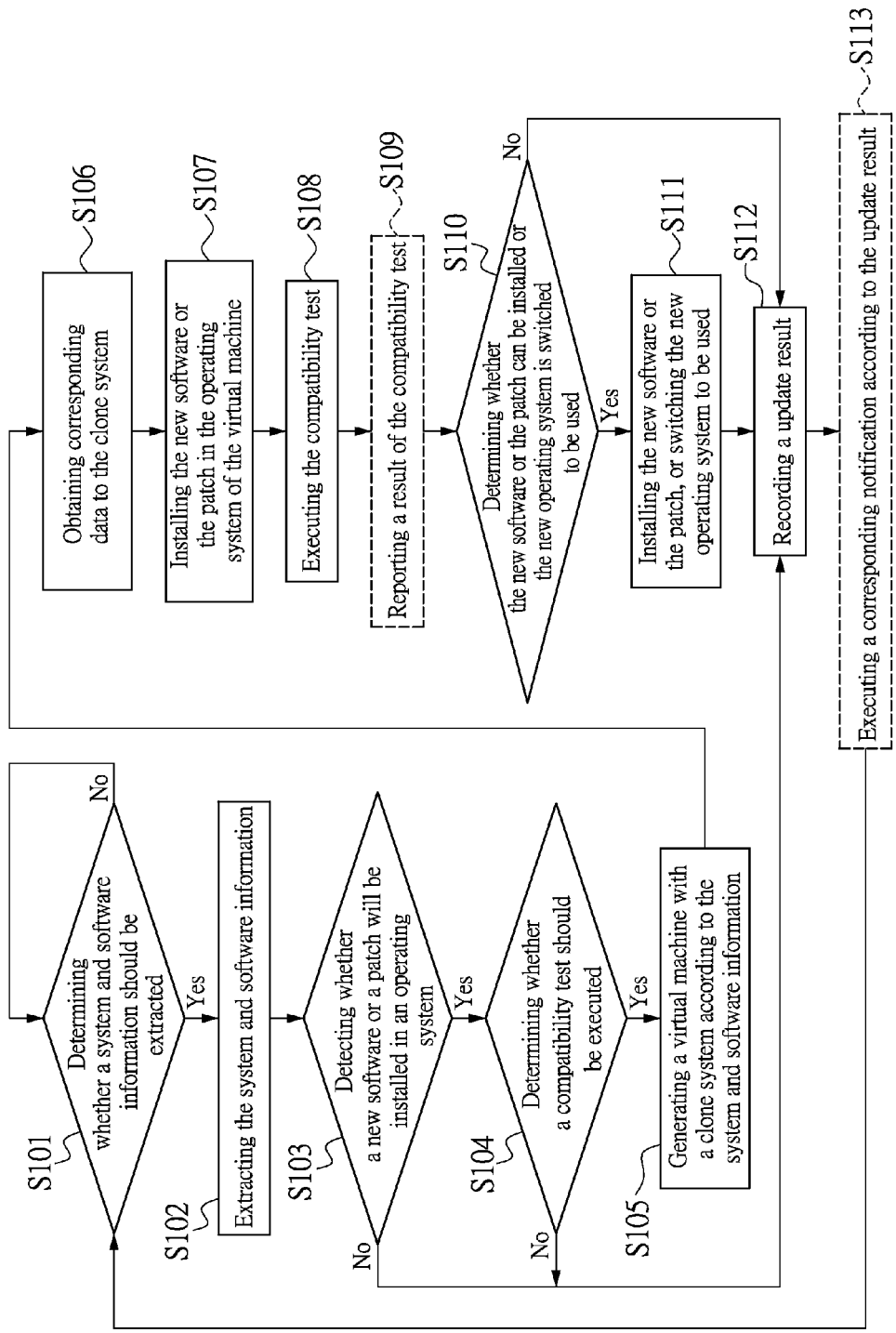
FIG. 1 is a flow chart of a method for pre-testing software compatibility according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

An exemplary embodiment of the present disclosure provides a method for pre-testing software compatibility, and the method for pre-testing software compatibility can automatically pre-test whether the incompatible problem will exist between the operating system and the installed softwares if the new software or the patch is installed in the current operating system. Since the software compatibility is pre-test by the method for pre-testing software compatibility, the MIS engineer can determine whether the new software or the patch can be installed according to the result of the compatibility test. Thus, the consumption of the storage space for storing the backup can be reduced efficiently, and the burden for the MIS engineer to install the new software and the patch can be also reduced. Moreover, based upon the concept of the method for pre-testing software compatibility, another exemplary embodiment of the present disclosure provides a software compatibility pre-testing system for executing the method for pre-testing software compatibility.

Referring to FIG. 1, FIG. 1 is a flow chart of a method for pre-testing software compatibility according to an exemplary embodiment of the present disclosure. The method for pre-testing software compatibility can be executed in a software compatibility pre-testing system which can be simply implemented by a computing device or a cloud server system, or alternatively implemented by a system formed by the computing device and the cloud server system.

Firstly, at steps S101, the computing device or the low level monitoring operating system (i.e. hypervisor) of the cloud server system determines whether a system and software information should be extracted, wherein the system information of the system and software information is for example a system version, system serial code, or system setting configuration, and the software information of the system and software information is for example a application software name, application software version, application software setting, and other application software information. If that the system and software information should be extracted is determined, step S102 is then executed; if that the system and software information should not be extracted is determined, step S101 is re-executed and step S102 is not executed until that the system and software information should be extracted is determined. Whether the time of the operating system reaches a specific time is judged to determine whether the system and software information should be extracted (i.e. periodically extracting the system and software information), or alternatively, whether a specific command is received is judged to determine whether the system and software information should be extracted. In a word, the present disclosure does not limit the implementation details of step S101.

Next, at step S102, the computing device or the low level monitoring operating system of cloud server system uses a software agent, such as a parser, to extract the system and software information. Additionally, the present disclosure does not limit the type of the system and software information. In the exemplary embodiment, the system and software information can for example comprise at least one of an operating system version (such as Windows 7 or Android 4.1), an operating system related configuration (such as system setting, registry, registering code, or mobile device setting), an application software version (such as document edition software version or mobile device message software version), an application software setting (such as web browser or document edition software related setting), and an operating system and application software patch installation list.

In the exemplary embodiment, the computing device or the low level monitoring operating system of the cloud server system can be set to periodically extract the system and software information; or alternatively, the computing device or the low level monitoring operating system of the cloud server system can extract the system and software information when the application software is initialized to install in the computing device or the virtual machine of the cloud server system; or alternatively, the computing device or the low level monitoring operating system of the cloud server system can extract the system and software information when a specific event happens during operation, such as the behavior of removing a software or modifying application software setting. In a word, when the computing device or the low level monitoring operating system of the cloud server system extracts the system and software information is not used to limit the present disclosure.

Next, at step S103, the computing device or the low level monitoring operating system of the cloud server system detects whether the patch (for example the patch of the software installed in the operating system or the operating system patch, i.e. updating the operating system or the software) or the new software will be installed in the operating system. If that the new software or the patch will be installed in the operating system is detected, step S104 is then be executed; if that the new software or the patch will be installed in the operating system is not detected, step S112 is then be executed. The computing device or the low level monitoring operating system of the cloud server system judges whether the user selects and clicks a specific file to execute the installation of the new software or the patch to detect whether the new software or the patch will be installed in the operating system; or alternatively, the computing device or the low level monitoring operating system of the cloud server system judges whether the computing device or the low level monitoring operating system of the cloud server system automatically downloads the file or the new software or the patch to automatically execute the installation of the new software or the patch in background to detect whether the new software or the patch will be installed in the operating system. In a word, the present disclosure does not limit the implementation details of step S103.

Then, at step S104, the computing device or the low level monitoring operating system of the cloud server system determines whether a compatibility test should be executed. If that the compatibility test should be executed is determined, step S105 is then executed; if that the compatibility test cloud not be executed is determined, step S112 is then executed. The computing device or the low level monitoring operating system of the cloud server system judges whether the user or the MIS engineer agrees the execution of the compatibility test to determine whether a compatibility test should be executed; or alternatively, the computing device or the low level monitoring operating system of the cloud server system judges whether the current environmental resource is suitable for executing the compatibility test to determine whether a compatibility test should be executed. In a word, the present disclosure does not limit the implementation details of step S104.

Next, at step S105, the computing device or the low level monitoring operating system of the cloud server system generates a virtual machine with a clone system according to the system and software information. To put it concretely, the computing device or the low level monitoring operating system of the cloud server system firstly generates a virtual machine with a clean operating system according to the operating system version and the operating system related configuration of the system and software information operating system, wherein the clean operating system is the clone system which the virtual machine merely installs the initial operating system and the required application software, and does not have the redundant system setting and data generated by the user operation. Next, according to the application software version, the application software setting, and the operating system and application software patch installation list, the clean operating system can used to generate the operating system which the computing device or the virtual machine of the cloud server system currently uses. In other words, the clone system of the virtual machine is functionally similar or equal to the operating system of the computing device or the virtual machine of the loud server system.

In addition, the above implementation of step S105 is not used to limit the present disclosure. Step S105 can be carried out by another implementation. For example, to reduce the time for generating the clone system, the computing device or the low level monitoring operating system of the cloud server system may store a common use operating system generated in advance, and the common use operating system operating system has common use softwares. Next, according to the system and software information, the computing device or the low level monitoring operating system of the cloud server system configures the common use operating system, adjusts settings of the common use softwares, and installs omitting softwares which have been installed in the operating system rather than the common use operating system in the common use operating system to generate the first clone system, so as to reduce the operating system of the computing device or the virtual machine of the cloud server system.

Next, at step S106, the computing device or the low level monitoring operating system of the cloud server system obtains corresponding data of all data in the operating system to generate the virtual machine, and copy the corresponding data to the clone system of the virtual machine, wherein the corresponding data is used for the compatibility test, i.e. the corresponding data is a subset of all data in the operating system, and is a portion of all data, which is used for the compatibility test. It is noted that, to avoid that the corresponding data may be updated, the computing device or the low level monitoring operating system of the cloud server system obtains the corresponding data, and copy the corresponding data to the clone system after the virtual machine with the clone system is generated, such that the accuracy of the compatibility test can be guaranteed. Then, at step S107, the computing device or the low level monitoring operating system of the cloud server system installs the new software or the patch in the clone system of the virtual machine.

In the exemplary embodiment of the present disclosure, when the operating system or the software is initialized to install, the computing device or the low level monitoring operating system of the cloud server system takes a shot of the installation proceeding or installation configuration script to generate a corresponding script, and uses the script to generate the virtual machine with the clone system. In another implementation, when the computing device or the low level monitoring operating system of the cloud server system uses the periodically backup system and software information of the operating system, the computing device or the low level monitoring operating system of the cloud server system generates the virtual machine with the clone system. In another implementation, when the computing device or the low level monitoring operating system of the cloud server system backups the operating system according to the specific event (such as the behavior of removing a software or modifying application software setting) during operation, the computing device or the low level monitoring operating system of the cloud server system generates the virtual machine with the clone system.

At step S108, the computing device or the low level monitoring operating system can use an active detection program to execute the compatibility test. The compatibility test comprises at least one of testing functions of the clone system which has installed the new software or the patch, comparing system states of the operating system and the clone system which has installed the new software or the patch, and comparing user experiences of the operating system and the clone system which has installed the new software or the patch.

To put it concretely, the computing device or the low level monitoring operating system of the cloud server system can execute startup, close, input/output value detections (such as the behavior which the web program executes the database querying) of the specific related softwares of the clone system which has installed the new software or the patch, so as to test the functions of the clone system which has installed the new software or the patch. In another implementation, while the operating system and the clone system which has installed the new software or the patch are operated, the computing device or the low level monitoring operating system of the cloud server system extracts informations (such as the software error message or the memory content) of the operating system and the clone system which has installed the new software or the patch, and compares the extracted informations, so as to compare system states of the operating system and the clone system which has installed the new software or the patch. In another implementation, the computing device or the low level monitoring operating system of the cloud server system continuously switches the operating system and the clone system which has installed the new software or the patch, and detects whether at least one of the user state and behavior (such as the user is disable to write down data in the specific column, and usually opens a specific window, or alternatively, the delay time which the operation command executed between the two systems exists) is changed when an user or a system software operates between the two system, so as to compare the user experiences of operating system and the clone system which has installed the new software or the patch.

Then, at step S109, the computing device or the low level monitoring operating system of the cloud server system reports the result of the compatibility test to the user or the MIS engineer, such as a human machine interface is provided to report the system compatibility state or error correcting suggest. It is noted that step S109 can be removed in the exemplary embodiment of the present disclosure, i.e. the result of the compatibility test is not reported to the user or the MIS engineer optionally.

Next, at step S110, the computing device or the low level monitoring operating system of the cloud server system determines whether the new software or the new patch can be installed in the operating system, or the low level monitoring operating system determines whether the new operating system (i.e. the clone system which has installed the new software or the new patch) can be switched to be used. If that the new software or the new patch can be installed in the operating system is determined, or that the new operating can be switched to be used is determined, step S111 is then executed; if that the new software or the new patch cannot be installed in the operating system is determined, and that the new operating cannot switched to be used is determined, step S112 is then executed. The computing device or the low level monitoring operating system of the cloud server system can automatically determines whether the new software or the patch can be installed according to the result of compatibility test; or alternatively, the user or the MIS engineer can input command to the computing device or the low level monitoring operating system of the cloud server system according to the result of compatibility test, so as to indicate whether the computing device or the low level monitoring operating system of the cloud server system can install the new software or the patch.

At step S111, the computing device or the low level monitoring operating system installs the new software or the patch in the operating system of the computing device or the virtual machine of the cloud server system, or alternatively, the cloud server system switches the virtual machine with the operating system to the virtual machine with the new operating system (i.e. the clone system which has installed the new software or the patch). Then, at step S112, the computing device or the low level monitoring operating system of the cloud server system records the update result. The computing device or the low level monitoring operating system of the cloud server system has the different update result according to different condition.

At step S113, the computing device or the low level monitoring operating system of the cloud server system provides a corresponding notification according to the update result. It is noted that, the existence of step S113 is not used to limit the present disclosure (i.e. step S113 can be removed). For example, the computing device or the low level monitoring operating system of the cloud server system can automatically schedules the next update checking time without notifying the user or the MIS engineer.

To put it concretely, if the operating system does not need to install the new software or the patch, or that the compatibility test should not be executed is determined, the update result record that the update or installation is not executed, and the operating system or the low level monitoring operating system can periodically notifies the user or the MIS engineer to execute the compatibility test and install the new software or the patch. If the new software or the patch is installed, or the new operating system is switched to be used after the compatibility test is executed, the update result records which patch or new software has been installed, and the operating system or the low level monitoring operating system notifies the user or the MIS engineer the message that the patch or the new software has been installed. If the new software or the patch is not installed, and the new operating system is not switched to be used after the compatibility test is executed, the update result records which patch or new software has been detected, and the operating system or the low level monitoring operating system notifies the user or the MIS engineer whether the installation of the new software or the patch can be executed.

It is noted that, since the method for pre-testing software compatibility can pre-test the software compatibility of the patch or the new software before the patch or the new software is installed, the system snapshot is not used to backup the whole operating system and the installed software in the operating system, and merely the system and software information is extracted. Thus, compared to the system snapshot, the method for pre-testing software compatibility can reduce the consumption of the storage space from several ten Giga-bytes to several Mega-bytes. Furthermore, the execution order of each step in FIG. 1 is not used to limit the present disclosure. In another exemplary embodiment, the execution order of each step in FIG. 1 can be adjusted slightly. For example, regardless of the corresponding data is newest, steps S105 and S106 can be exchanged, or alternatively, steps S106 and S107 can be exchanged, i.e. the corresponding data is obtained to the clone system after the new software and the patch is installed in the clone system of the virtual machine.

Figure 2A:
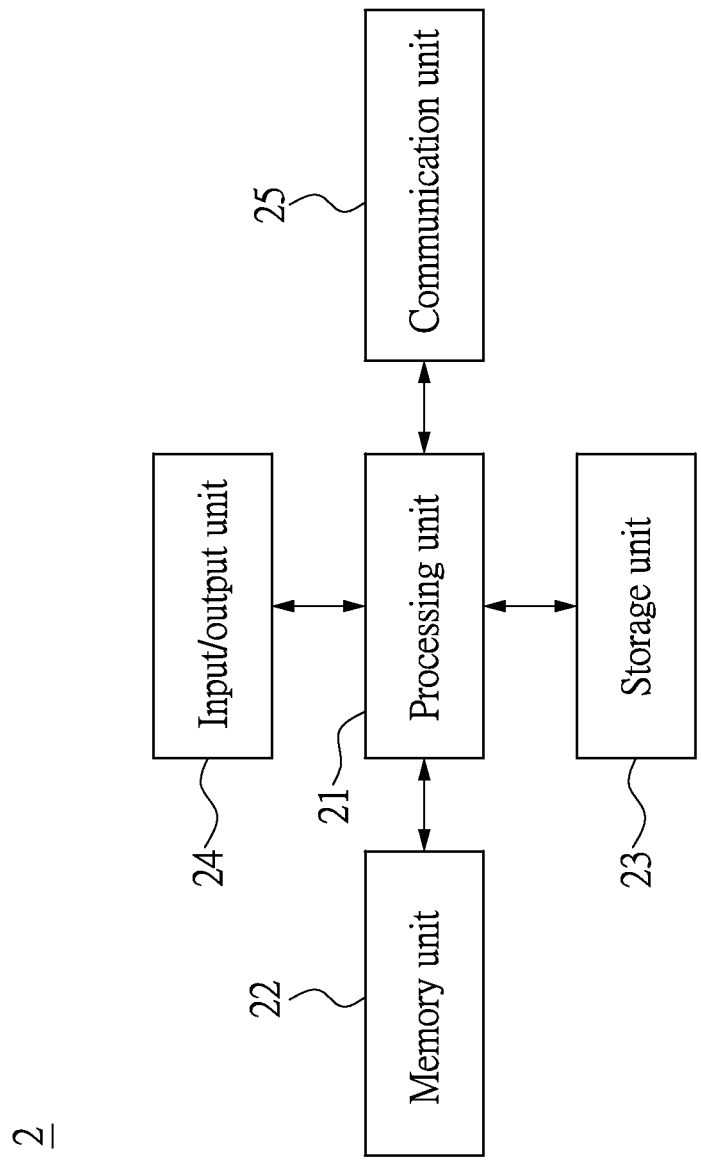
FIG. 2A is a block diagram of a computing device according to an exemplary embodiment of the present disclosure.

The method for pre-testing software compatibility is executed in the software compatibility pre-testing system, and as mentioned above, the software compatibility pre-testing system can be implemented merely by the computing device or the cloud server system, or alternatively implemented by the system formed by the computing device and the cloud server system. Referring to FIG. 2A, FIG. 2A is a block diagram of a computing device according to an exemplary embodiment of the present disclosure. The computing device 2 comprises a processing unit 21, a memory unit 22, a storage unit 23, an input/output unit 24, and a communication unit 25. The processing unit 21 is electrically connected to the memory unit 22, the storage unit 23, the input/output unit 24, and the communication unit 25. The processing unit 21 is used to access the data in the memory unit 22 and the storage unit 23, and to control the input/output unit 24 and the communication unit 25.

In the exemplary embodiment, the codes of the method for pre-testing software compatibility and the data related to the installed software or operating system can be stored in the storage unit 23. The memory unit 22 is used to temporally store the data or values generated by the processing unit 21. The input/output unit 24 is an interface between the computing device 2 and the user or the MIS engineer. The communication unit 25 makes the computing device 2 linked to the other computing device or the cloud server system.

Figure 2B:
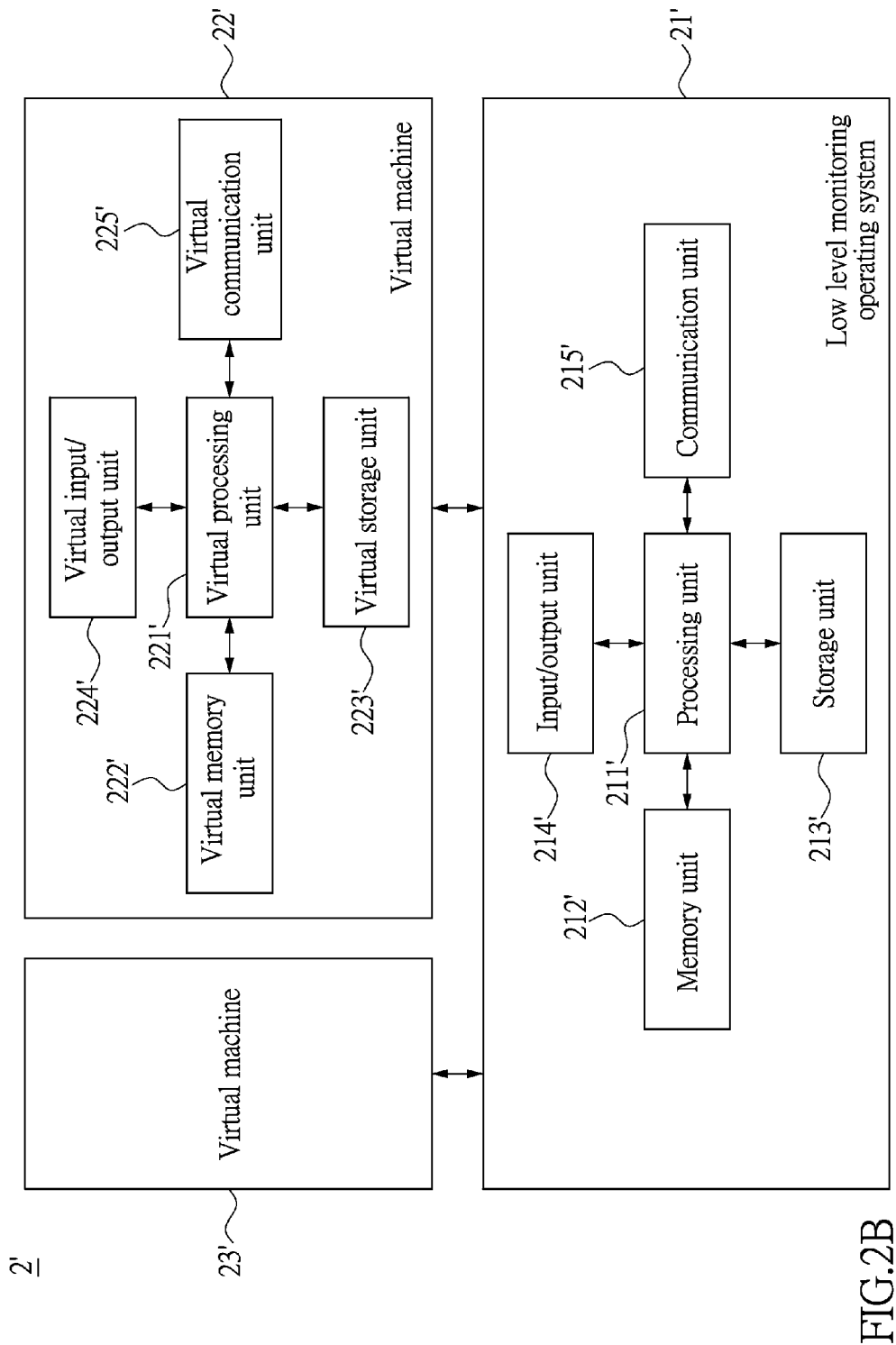
FIG. 2B is a block diagram of a cloud server system according to an exemplary embodiment of the present disclosure.

Referring to FIG. 2B, FIG. 2B is a block diagram of a cloud server system according to an exemplary embodiment of the present disclosure. The cloud server system 2' has a low level monitoring operating system 21' and at least two virtual machines 22', 23'. It is noted that, the virtual machines 22', 23', and the low level monitoring operating system 21' are not physically linked to each other, and the low level monitoring operating system 21' allocates resources to generate the virtual machines 22', 23'.

The low level monitoring operating system 21' has a processing unit 211', a memory unit 212', a storage unit 213', an input/output unit 214', and a communication unit 215'. The processing unit 211' is electrically connected to the memory unit 212', the storage unit 213', the input/output unit 214', and the communication unit 215'. The processing unit 211' is used to access the data in the memory unit 212' and the storage unit 213', and control the input/output unit 214' and the communication unit 215'.

The codes of the method for pre-testing software compatibility and the data related to the installed software or operating system can be stored in the storage unit 213'. The memory unit 212' is used to temporally store the data or values generated by the processing unit 211'. The input/output unit 214' is an interface between the low level monitoring operating system 21' and the user or the MIS engineer. The communication unit 215' makes the low level monitoring operating system 21' linked to the other computing device or the cloud server system.

According to requirements of the generate the virtual machines 22' and 23', the low level monitoring operating system 21' allocates the resources of the processing unit 211', the memory unit 212', the storage unit 213', the input/output unit 214', and the communication unit 215', so generate the virtual machines 22' and 23'. The virtual machines 22' and 23 respectively comprise independent or different operating systems (such as Microsoft Window, Linux, Mac OSX, and Google Android, and the present disclosure is not limited thereto). In addition, the virtual machines 22' and 23' have independent virtual processing unit, virtual storage units, virtual memory units, virtual input/output units, and virtual communication units.

For example, the virtual machine 22' has a virtual processing unit 221', a virtual memory unit 222', a virtual storage unit 223', a virtual input/output unit 224', and a virtual communication unit 225', wherein the virtual processing unit 221' is logically connected (not physically connected) to the virtual memory unit 222', the virtual storage unit 223', the virtual input/output unit 224', and the virtual communication unit 225'. The virtual processing unit 221' is used to access the data in the virtual memory unit 222' and the virtual storage unit 223', and control the virtual input/output unit 224' and the virtual communication unit 225'.

The codes of the method for pre-testing software compatibility and the data related to the installed software or operating system can be stored in the virtual storage unit 223'. The virtual memory unit 222' is used to temporally store the data or values generated by the processing unit 221'. The virtual input/output unit 224' is an interface between the virtual machine 22' and the user or the MIS engineer. The virtual communication unit 225' makes the virtual machine 22' linked to the other computing device or the cloud server system.

Figure 3A:
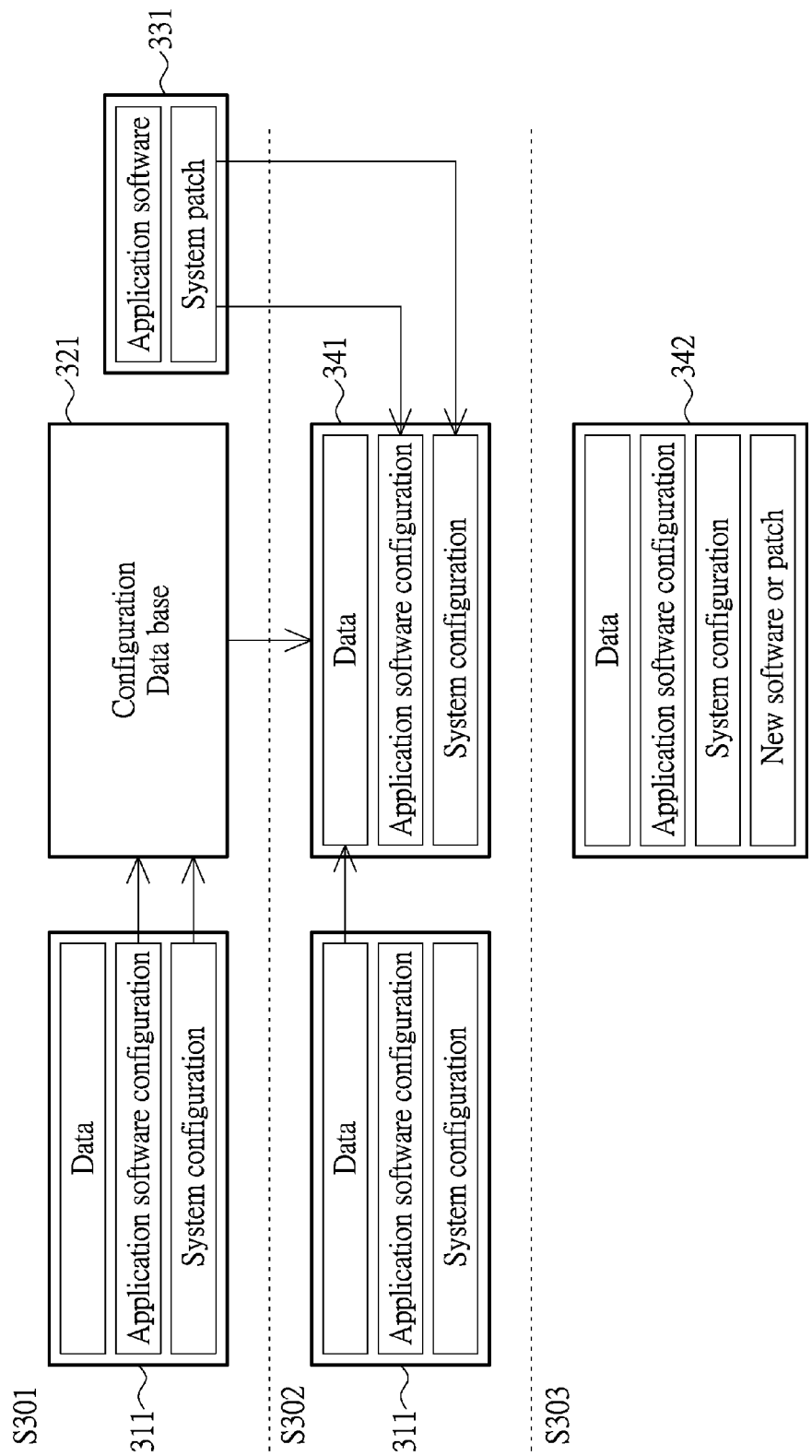
FIG. 3A and FIG. 3B are schematic diagrams of a method for pre-testing software compatibility according to an exemplary embodiment of the present disclosure.
Figure 3B:
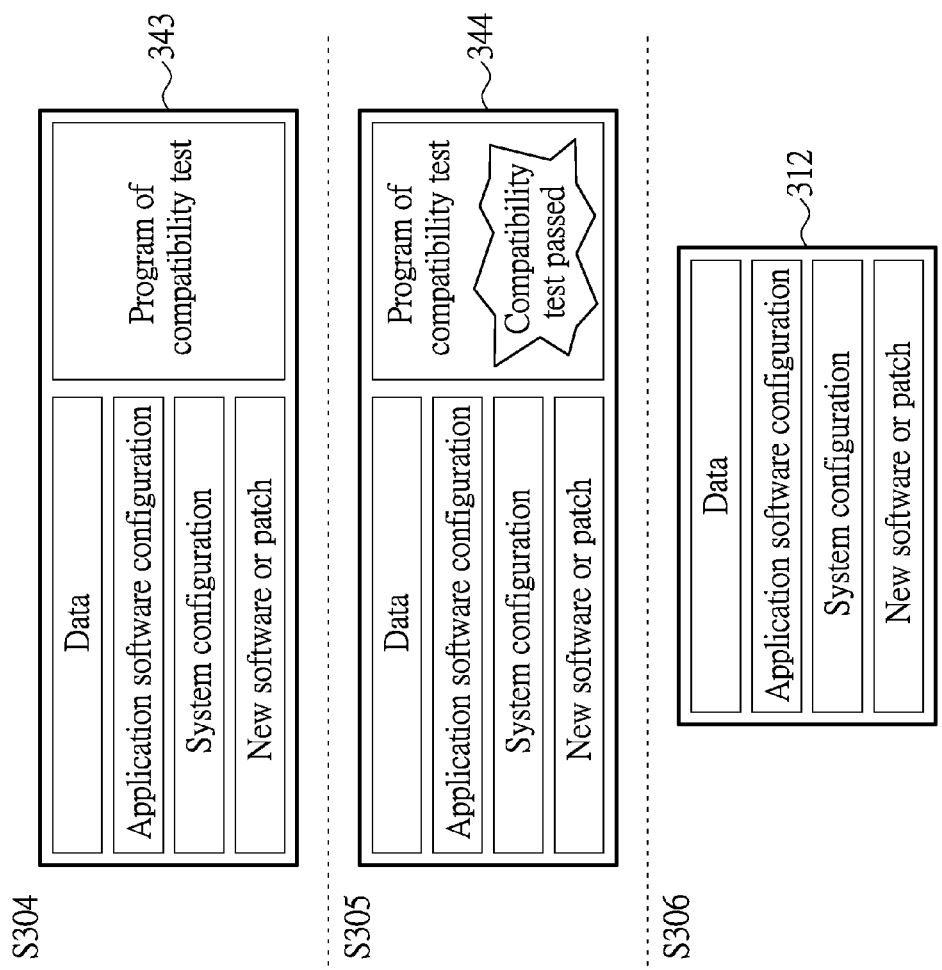

Referring to FIG. 3A and FIG. 3B, FIG. 3A and FIG. 3B are schematic diagrams of a method for pre-testing software compatibility according to an exemplary embodiment of the present disclosure. In the exemplary embodiment, the software compatibility pre-testing system can be consisted of merely one computing device, but the present disclosure is not limited thereto. The operating system 311 of the computing device has data, application software configuration, and system configuration stored in the storage unit of the computing device. The storage unit has a configuration database 321 and a resource pool 331, wherein the configuration database 321 is used to store at least one system configuration, and the resources pool 331 stores the installation files of the application softwares and patches of the operating systems or the softwares.

At step S301, the computing device extracts the application software configuration and the system configuration (i.e. the system and software information) of the operating system 311 to the configuration database 321. When the user or the MIS engineer uses the user interface to check software compatibility, or the operating system automatically checks software compatibility, step S302 is then executed. At step S302, a virtual machine with a clone system 341 is generated, wherein the clone system 341 is functionally similar or equal to the operating system 311. The details of step S302 are illustrated. Firstly, the computing device generates a virtual machine with a clean operating system therein according to the system configuration of the configuration database 321. Next, by using the automatic installation program, the related application softwares and the patches of the softwares or the operating system are installed in the clean operating system to generate a clone system, then according to the application software configuration and the system configuration, the clone system is configured, and the settings of the softwares are adjusted. Next, the computing device obtains the corresponding data from the operating system 311 to the clone system, so as to generate a clone system 341 which is functionally similar or equal to the operating system 311.

Next, at step S303, the new software or the patch is installed in the clone system 341, to generate a clone system 342 which has installed the new software or the patch. At step S304, the program of the compatibility test is introduced in the virtual machine with the clone system 342 to generate a clone system 343, wherein the program of the compatibility test is a script which is used to execute startup, close, input/output value detections of specific related softwares in the clone system 342. For example, if the number which the specific related softwares successfully startups, closes, or has the correct input/output values is larger than a specific threshold, the new software or the patch passes the compatibility test. At step S305, through the human machine interface, the computing device reports the system compatibility state and the error correction. At step S305, after the compatibility test of the clone system 343 is executed, a clone system 344 is generated, wherein the clone system 344 has the system compatibility state being presented that the installed new software or patch has passed the compatibility test. Then, at step S306, the user or the MIS engineer uses the user interface to confirm the execution for installing the new software or the patch in the operating system 311, and thus the operating system 311 becomes an operating system 312 which has installed the new software or the patch.

Figure 4A:
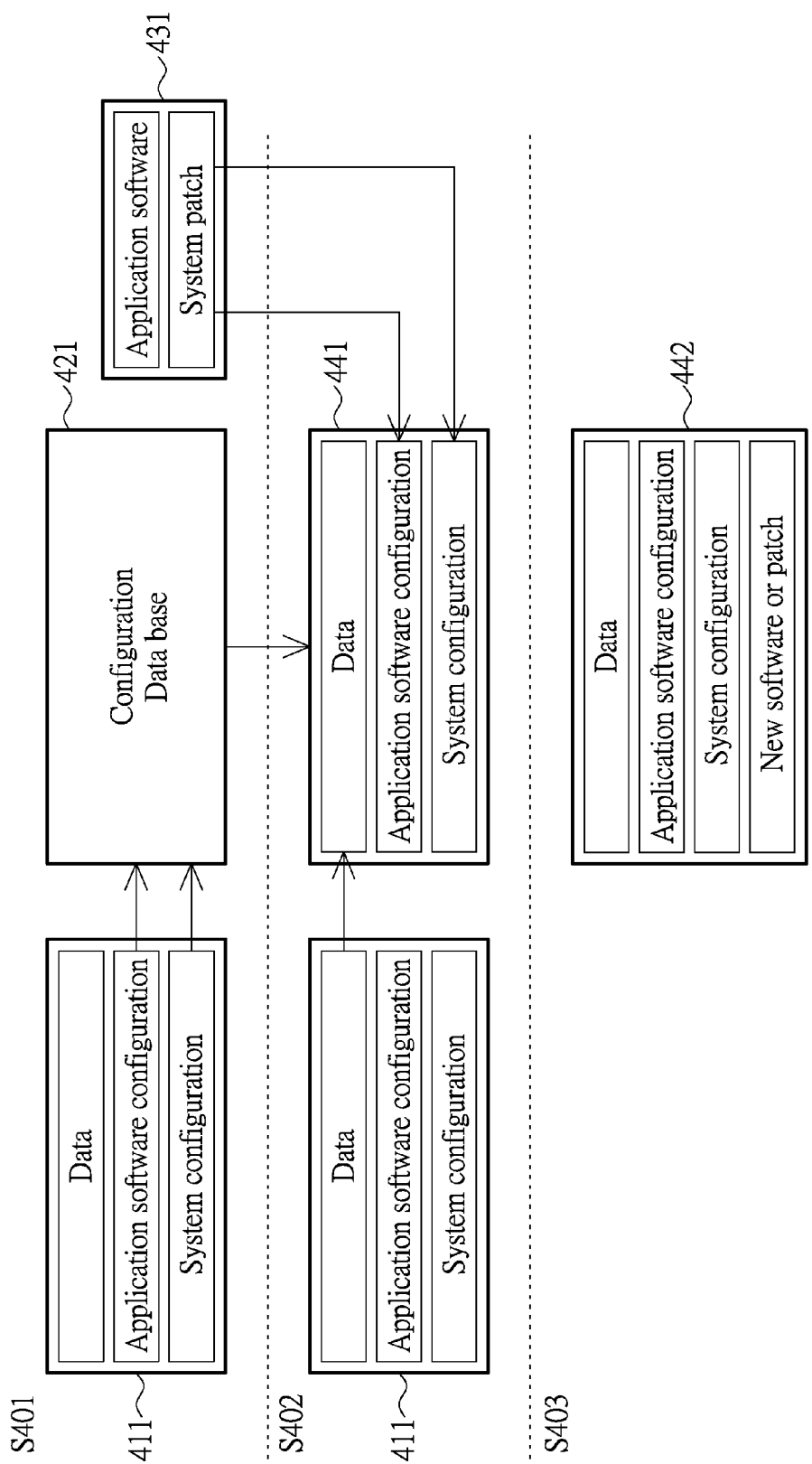
FIG. 4A and FIG. 4B are schematic diagrams of a method for pre-testing software compatibility according to another exemplary embodiment of the present disclosure.
Figure 4B:
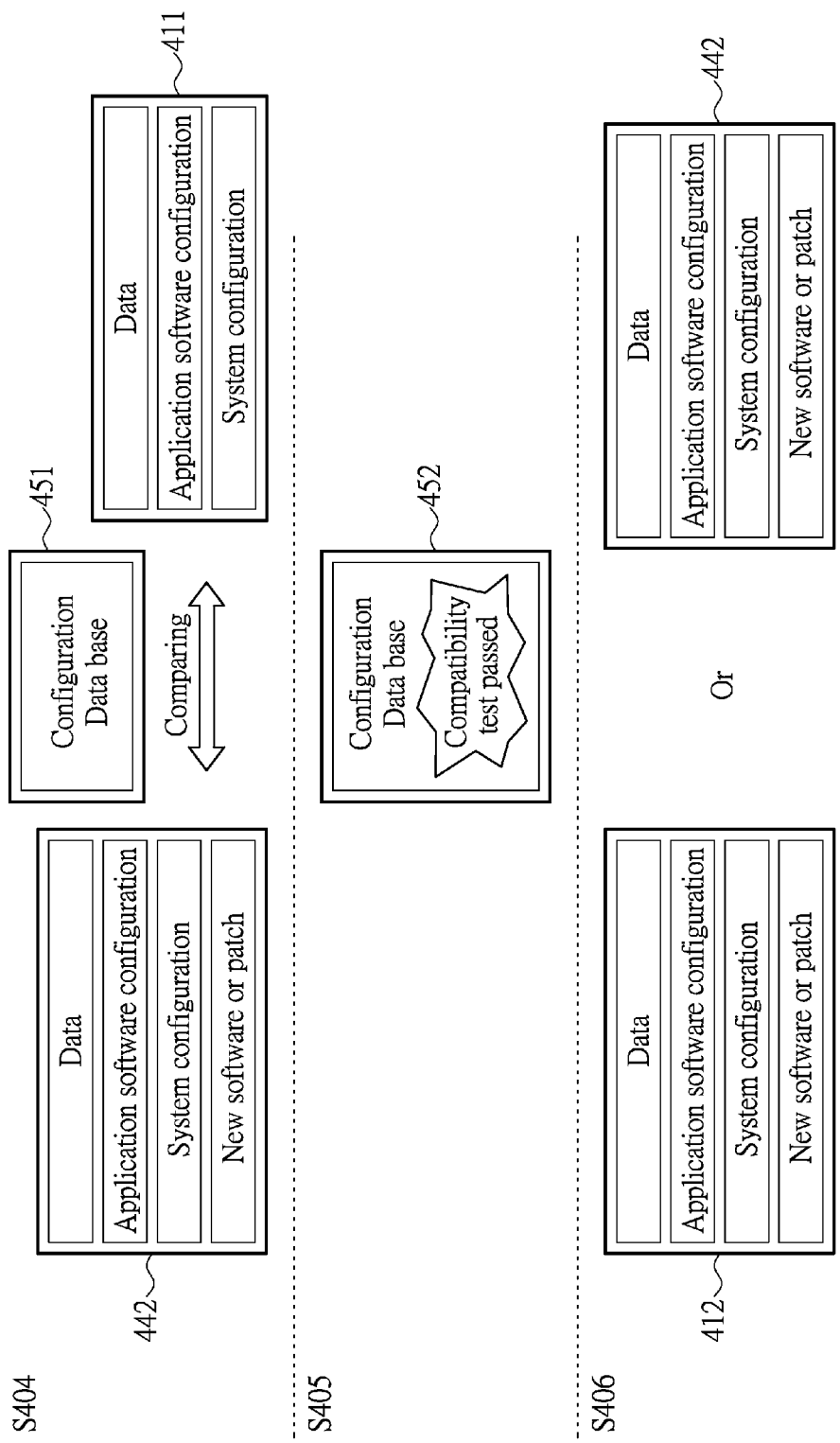

Next, referring to FIG. 4A and FIG. 4B, FIG. 4A and FIG. 4B are schematic diagrams of a method for pre-testing software compatibility according to another exemplary embodiment of the present disclosure. In the exemplary embodiment, the software compatibility pre-testing system can be consisted of merely one cloud server system, but the present disclosure is not limited thereto. The operating system 411 operated in the virtual machine of the cloud server system has data, application software configuration, and system configuration stored in the storage unit of the cloud server system. In addition, the storage unit has configuration database 421 and a resource pool 431, wherein the configuration database 421 is used to storage at least one system configuration, and the resources pool 431 stores the installation files of the application softwares and patches of the operating systems or the softwares.

At step S401, the cloud server system extracts the application software configuration and the system configuration (i.e. the system and software information) of the operating system 411 of the virtual machine to the configuration database 421. When the user or the MIS engineer uses the user interface to check software compatibility, or the operating system automatically checks software compatibility, step S402 is then executed. At step S402, a virtual machine with a clone system 441 is generated, wherein the clone system 441 is functionally similar or equal to the operating system 411. The details of step S402 are illustrated. Firstly, the cloud server system generates a virtual machine with a clean operating system therein according to the system configuration of the configuration database 421. Then, by using the automatic installation program, the related application softwares and the patches of the softwares or the operating system are installed in the clean operating system to generate a clone system, then according to the application software configuration and the system configuration, the clone system is configured, and the settings of the softwares are adjusted. Next the cloud server system obtains the corresponding data from the operating system 411 of the virtual machine therein to the clone system, so as to generate a clone system 441 which is functionally similar or equal to the operating system 411.

Next, at step S403, the new software or the patch is installed in the clone system 441, to generate a clone system 442 which has installed the new software or the patch. At step S404, the program of the compatibility test in the low level monitoring operating system 451 of the cloud server system is executed to extract and compare informations (such as software error message or the memory content) of the operating system 411 and the clone system 442 while the operating system 411 and the clone system 442 are operated, continuously switch the operating system 411 and the clone system 422, and detect whether an user state or behavior is changed when an user or a system software operates between the operating system 411 and the clone system 422 (such as the user is disable to write down data in the specific column, and usually opens a specific window, or alternatively, the delay time which the operation command executed between the two systems exists). Since at step S404, the operating system 411 and the clone system 442 need to be switched, the program of the compatibility test is stored in the low level monitoring operating system 451 of the cloud server, and executed by the low level monitoring operating system 451.

For example, if the number which the extracted informations of the two systems are the same is larger than a specific threshold, or/and the user state or behavior changes slightly, the new software and the patch passes the compatibility test. The above illustration is just for one exemplary example, and the application scope, using manner, steps, or step execution order of the present disclosure is not limit thereto. At step S405, after the program of the compatibility test is executed, the a low level monitoring operating system 452 of the cloud server system is generated, wherein the low level monitoring operating system 452 has the system compatibility state being presented that the installed new software or patch has passed the compatibility test. Then, at step S406, the user or the MIS engineer uses the user interface to confirm the execution for installing the new software or the patch in the operating system 411 of the virtual machine, and thus the operating system 411 becomes an operating system 412 which has installed the new software or the patch; or alternatively, the user or the MIS engineer uses the user interface to confirm the execution for replacing the operating system 411 with the operating system 442, and copying the other data (except for the corresponding data for the compatibility test) in operating system 411 of the virtual machine to the clone system 442.

It is noted that, step S404 can merely extract and compare informations (such as software error message or the memory content) of the operating system 411 and the clone system 442 while the operating system 411 and the clone system 442 are operated; or alternatively, step S404 can merely continuously switch the operating system 411 and the second clone system 422, and detect whether an user state or behavior is changed when an user or a system software operates between the operating system 411 and the clone system 422.

If step S404 merely extracts and compares informations of the operating system 411 and the clone system 442 while the operating system 411 and the clone system 442 are operated (i.e. does not switch the operating system 411 and the clone system 442), the program of the compatibility test can be introduced in the clone system 442 of the virtual machine, and executed by the clone system 442. Next, at step S405, the clone system 442 having the system compatibility state being presented that the new software or the patch passes the compatibility test is generated.

Figure 5:
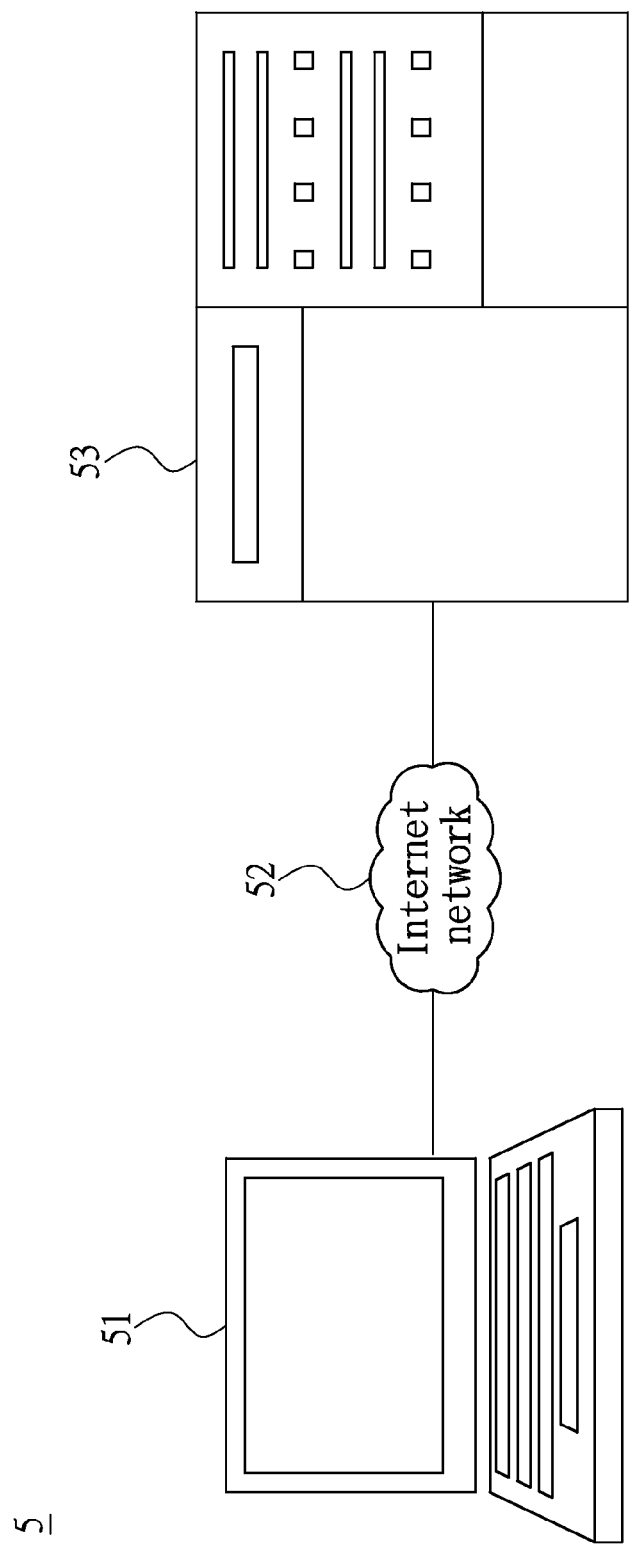
FIG. 5 is a schematic diagram of a software compatibility pre-testing system according to an exemplary embodiment of the present disclosure.

Referring to FIG. 5, FIG. 5 is a schematic diagram of a software compatibility pre-testing system according to an exemplary embodiment of the present disclosure. In the exemplary embodiment, the software compatibility pre-testing system 5 comprises a computing device 51 and a cloud server system 53, wherein the computing device 51 is linked to the cloud server system 53 through the internet network 52. The user can use the cloud server system 53 through the computing device 51, or directly operate the cloud server system 53. The cloud server system 53 can have the administration right, so as to control the computing device 51 to install the new software or the patch. However, the present disclosure is not limited thereto, and in another implementation, the computing device 51 has the administration right itself.

Figure 6A:
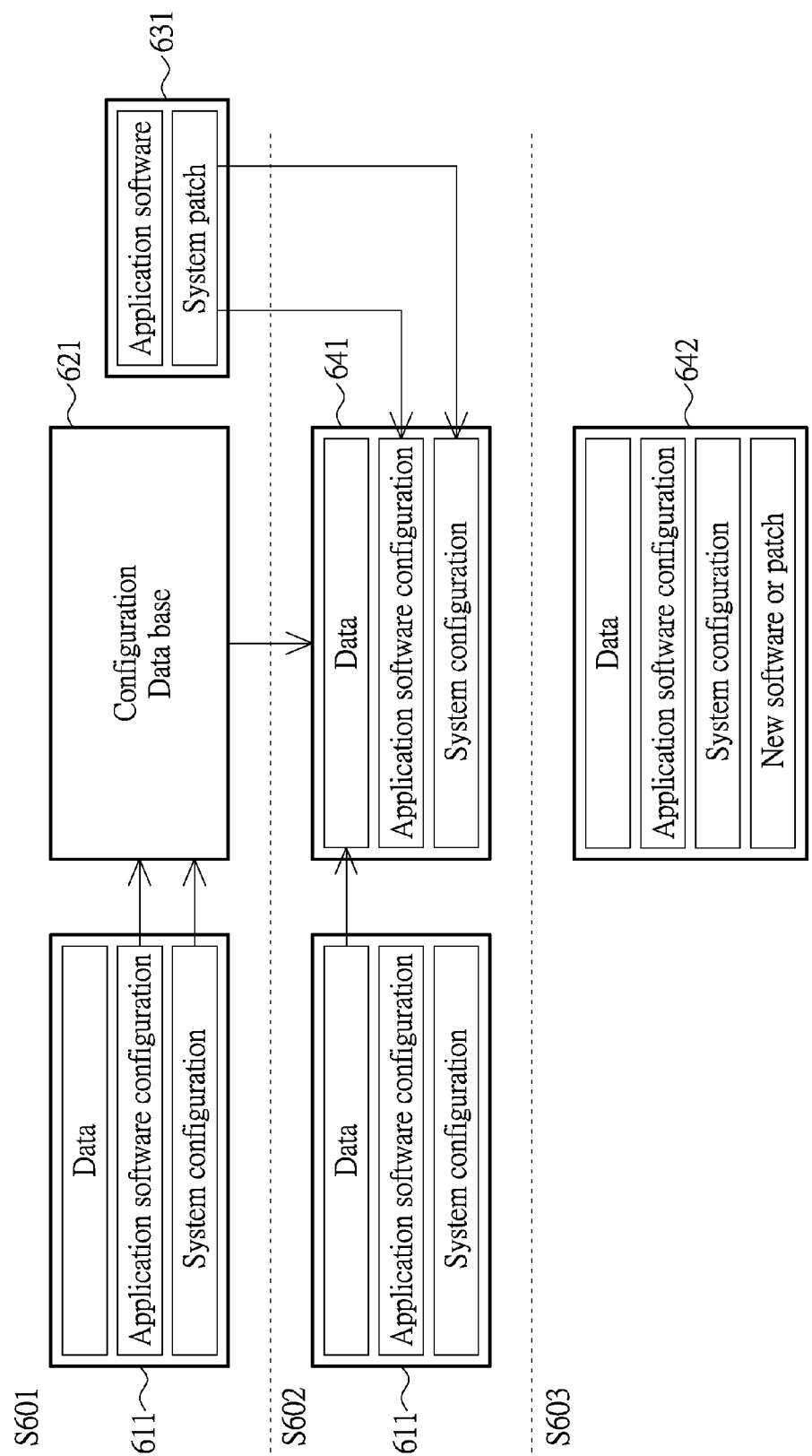

Referring to FIG. 6A and FIG. 6B, FIG. 6A and FIG. 6B are schematic diagrams of a method for pre-testing software compatibility according to another exemplary embodiment of the present disclosure. In the exemplary embodiment, the software compatibility pre-testing system comprises a computing device and a cloud server system. The operating system 611 of the computing device has data, application software configuration, and system configuration stored in the storage unit of the computing device. In addition, the storage unit of cloud server system has a configuration database 621 and a resource pool 631, wherein the configuration database 621 is used to storage at least one system configuration, and the resources pool 631 stores the installation files of the application softwares and patches of the operating systems or the softwares.

At step S601, the computing device extracts the application software configuration and the system configuration (i.e. the system and software information) of the operating system 611 to the configuration database 621 of the cloud server system. When the user or the MIS engineer uses the user interface to check software compatibility (can be determined by the computing device or the cloud server system), or the operating system automatically checks software compatibility, step S602 is then executed. At step S602, a virtual machine with a clone system 641 in the cloud server system is generated, wherein the clone system 641 is functionally similar or equal to the operating system 611. The details of step S602 are illustrated. Firstly, the cloud server system generates a virtual machine with a clean operating system therein according to the system configuration of the configuration database 621. Then, by using the automatic installation program, the related application softwares and the patches of the softwares or the operating system are installed in the clean operating system to generate a clone system, then according to the application software configuration and the system configuration, the clone system is configured, and the settings of the softwares are adjusted. Next, the cloud server system obtains the corresponding data from the operating system 611 of the computing device to the clone system, so as to generate a clone system 641 which is functionally similar or equal to the operating system 611.

Next, at step S603, the new software or the patch is installed in the clone system 641, to generate a clone system 642 which has installed the new software or the patch. At step S604, the program of the compatibility test is introduced in the virtual machine with the clone system 642 to generate a clone system 643, wherein the program of the compatibility test is used to is executed to extract and compare informations (such as software error message or the memory content) of the operating system 611 and the clone system 642 while the operating system 611 and the clone system 642 are operated, and the program of the compatibility test may further executes startup, close, input/output value detections of specific related softwares in the clone system 642. For example, if the number which the extracted informations of the two systems are the same is larger than a specific threshold, and the number which the specific related softwares successfully startups, closes, or has the correct input/output values is larger than another specific threshold, the new software or the patch passes the compatibility test. At step S605, after the compatibility test of the clone system 643 is executed, a clone system 644 is generated, wherein the clone system 644 has the system compatibility state being presented that the installed new software or patch has passed the compatibility test. Then, at step S606, the user or the MIS engineer uses the user interface to confirm the execution for installing the new software or the patch in the operating system 611 (executed by the computing device), and thus the operating system 611 becomes an operating system 612 which has installed the new software or the patch.

To sum up, exemplary embodiments of the present disclosure provide a method for pre-testing software compatibility and a system thereof, wherein the compatibility of the new software or the patch for the current operating system is pre-tested before the new software or the patch is installed in the operating system, such that the nuisance for recovering the operating system and the serious loss caused by that the operating system cannot be recovered can be avoided after the incompatible problem occurs. Furthermore, the patch reliance for the user can be increased, so as to enhance the information security. Moreover, the method for pre-testing software compatibility and a system thereof do not cause exhaustive storage space consumption, and can be carried out simply, therefore having beneficial economy result.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for pre-testing software compatibility, executed in at least one of a computing device and a cloud server system, comprising:
    extracting a system and software information of an operating system, by using a software agent in the computing device or the software agent in a low level monitoring operating system of the cloud server system;
    while detecting that a patch or a new software will be installed in the operating system, determining whether a compatibility test should be executed;
    while detecting that the compatibility test should be executed, generating a virtual machine with a first clone system, wherein the first clone system is generated according to the system and software information;
    installing the patch or the new software in the first clone system to generate a second clone system;
    executing the compatibility test for the second clone system; and
    according to a result of the compatibility test, determining whether the patch or the new software can be installed or determining whether the second clone system can be switched to be used;
    wherein the compatibility test comprises comparing system states of the second clone system and the operating system, wherein informations of the operating system and the second clone system are extracted while the operating system and the second clone system are operated, and the informations are compared so as to achieve comparing the system states of the second clone system and the operating system.

2. The method for pre-testing software compatibility according to claim 1, wherein when determining that the compatibility test should be executed, obtaining corresponding data of all data in the operating system to generate the virtual machine, wherein the corresponding data is used for the compatibility test, and the first clone system is generated according to the system and software information and the corresponding data.

3. The method for pre-testing software compatibility according to claim 1, further comprising:
when that the patch or the new software can be installed in the operating system is determined, installing the patch or the new software in the operating system, or when that the second clone system can be switched to be used is determined,
switching the second clone system to be used.

4. The method for pre-testing software compatibility according to claim 2, wherein in the step for generating the first clone system, generating a third clone system according to the system and software information in the virtual machine, then, installing installed softwares and installed patches of the operating system in the third system to generate a fourth clone system, and obtaining the corresponding data for the fourth clone system to generate the first clone system, wherein the third clone system is a clean operating system.

5. The method for pre-testing software compatibility according to claim 1, wherein in the step for generating the first clone system, obtaining a common use operating system which is generated in advance, and the common use operating system has common use softwares, then, according to the system and software information, configuring the common use operating system, adjusting settings of the common use softwares, and installing omitting softwares which have been installed in the operating system rather than the common use operating system in the common use operating system to generate the first clone system.

6. The method for pre-testing software compatibility according to claim 1, wherein the system and software information comprises at least one of an operating system version, an operating system related configuration, an application software version, an application software setting, and an operating system and application software patch installation list.

7. The method for pre-testing software compatibility according to claim 1, wherein the compatibility test further comprises at least one of testing functions of the second clone system and comparing user experiences of the second clone system and the operating system.

8. The method for pre-testing software compatibility according to claim 7, wherein executing startup, close, input/output value detections of specific related softwares in the second clone system to test the functions of the second clone system.

9. A software compatibility pre-testing system, comprising:
a computing device;
wherein the computing device use a software agent to extract a system and software information of an operating system; when the computing device detects that a patch or a new software will installed in the operating system, the computing device determines whether a compatibility test should be executed; when the computing device determines that the compatibility test should be executed, the computing device generates a virtual machine with a first clone system, wherein the first clone system is generated according to the system and software information; the computing device installs the patch or the new software in the first clone system to generate a second clone system; the computing device executes the compatibility test for the second clone system; according to a result of the compatibility test, the computing device determines whether the patch or the new software can be installed in the operating system;
wherein the compatibility test comprises comparing system states of the second clone system and the operating system, wherein informations of the operating system and the second clone system are extracted while the operating system and the second clone system are operated, and the informations are compared so as to achieve comparing the system states of the second clone system and the operating system.

10. The method for pre-testing software compatibility according to claim 7, wherein continuously switching the operating system and the second clone system, and detecting whether an user state or behavior is changed when an user or a system software operates between the operating system and the second clone system, so as to compare the user experiences of the second clone system and the operating system.

11. The software compatibility pre-testing system according to claim 9, wherein when that the compatibility test should be executed is determined, the computing device obtains corresponding data of all data in the operating system to generate the virtual machine, wherein the corresponding data is used for the compatibility test, and the first clone system is generated according to the system and software information and the corresponding data.

12. A software compatibility pre-testing system, comprising:
a cloud server system;
wherein a low level monitoring operating system of the cloud server system uses a software agent extract a system and software information of an operating system operated in a first virtual machine of the cloud server system; when the cloud server system detects that a patch or a new software will be installed in the operating system, the cloud server system determines whether a compatibility test should be executed; when the cloud server system determines that the compatibility test should be executed, the cloud server system generates a second virtual machine with a first clone system, wherein the first clone system is generated according to the system and software information; the cloud server system installs the patch or the new software in the first clone system to generate the second virtual machine with a second clone system; the cloud server system executes the compatibility test for the second clone system; according to a result of the compatibility test, the cloud server system determines whether the patch or the new software can be installed in the operating system of the first virtual machine, or determines whether the second virtual machine with the second clone system can be switched to be used;
wherein the compatibility test comprises comparing system states of the second clone system and the operating system, wherein informations of the operating system and the second clone system are extracted while the operating system and the second clone system are operated, and the informations are compared so as to achieve comparing the system states of the second clone system and the operating system.

13. The software compatibility pre-testing system according to claim 12, wherein when that the compatibility test should be executed is determined, the cloud server system obtains corresponding data of all data in the operating system to generate the second virtual machine, wherein the corresponding data is used for the compatibility test, and the first clone system is generated according to the system and software information and the corresponding data.

14. A software compatibility pre-testing system, comprising:
  a computing device; and
  a cloud server system, linked to the computing device through an internet network;
  wherein the computing device use a software agent to extract a system and software information of an operating system to the cloud server system; when the computing device or the cloud server system detects that a patch or a new software will be installed in the operating system, the computing device or the cloud server system determines whether a compatibility test should be executed; when the computing device or the cloud server system determines that the compatibility test should be executed, the cloud server system generates a virtual machine with a first clone system, wherein the first clone system is generated according to the system and software information; the cloud server system installs the patch or the new software in the first clone system to generate a second clone system; the cloud server system executes the compatibility test for the second clone system; according to a result of the compatibility test, the computing device determines whether the patch or determines whether the new software can be installed in the operating system;
  wherein the compatibility test comprises comparing system states of the second clone system and the operating system, wherein informations of the operating system and the second clone system are extracted while the operating system and the second clone system are operated, and the informations are compared so as to achieve comparing the system states of the second clone system and the operating system.

15. The software compatibility pre-testing system according to claim 14, wherein when that the compatibility test should be executed is determined, the computing device obtains corresponding data of all data in the operating system to the cloud server system, so as to generate the virtual machine, wherein the corresponding data is used for the compatibility test, and the first clone system is generated according to the system and software information and the corresponding data.

* * * * *